United States Patent [19]
Matsuda

[11] Patent Number: 5,828,544
[45] Date of Patent: Oct. 27, 1998

[54] ELECTRONIC UNIT FIXING STRUCTURE OF ELECTRONIC UNIT BOX

[75] Inventor: Hiroyuki Matsuda, Shizuoka, Japan

[73] Assignee: Yazaki Corporation, Tokyo, Japan

[21] Appl. No.: 856,167

[22] Filed: May 14, 1997

[30] Foreign Application Priority Data

May 24, 1996 [JP] Japan .................................. 8-129951

[51] Int. Cl.⁶ .................................................. H02B 1/26
[52] U.S. Cl. ...................... 361/641; 361/600; 361/601; 174/50; 174/50.51; 174/52.1; 439/374
[58] Field of Search ...................... 361/641, 642, 361/643, 600, 601; 174/50, 50.5, 52.1, 50.51; 439/374, 680; 220/804

[56] References Cited

U.S. PATENT DOCUMENTS 4,600,449  7/1986  White et al. ........................ 148/407
4,654,470  3/1987  Feldman et al. ........................ 174/50

FOREIGN PATENT DOCUMENTS

| 62-19021 | 2/1987 | Japan | H02G 3/16 |
| 63-118273 | 7/1988 | Japan | H05K 5/02 |
| 64-39679 | 3/1989 | Japan | H05K 5/00 |
| 5-41052 | 6/1993 | Japan | H01K 85/22 |

*Primary Examiner*—Gerald P. Tolin
*Assistant Examiner*—Boris L. Chervinsky
*Attorney, Agent, or Firm*—Sughrue, Mion, Zinn, Macpeak & Seas, PLLC

[57] ABSTRACT

A lid of an electronic unit box has a plurality of first fixing ribs and a plurality of second fixing ribs on the top wall thereof which are arranged parallel. The first and second fixing ribs have step-shaped cuts in such a manner that the cuts are opposite to each other, so that when the box body is covered with the lid, the cuts of the fixing ribs are abutted against the opposite edges of the electronic unit to fixedly hold the electronic unit.

4 Claims, 3 Drawing Sheets

ELECTRONIC UNIT FIXING STRUCTURE OF ELECTRONIC UNIT BOX

BACKGROUND OF THE INVENTION

This invention relates to an electronic unit fixing structure which is used to accommodate an electronic unit in an electronic unit box which is mainly used for an electronic circuit in an automobile.

The structure of a conventional electronic unit box is as shown in FIGS. 5 and 6.

The electronic unit box is formed, as one unit, of synthetic resin. Inside a box body "a", a rectangular-tube-shaped inner wall "b" is protruded upwardly from the bottom. Inside the space "c" defined by the inner wall "b" (hereinafter referred to as "an inner space", when applicable), an electronic unit such as a fuel injection controlling electronic unit "d" is accommodated. The electronic unit box, after being covered with a lid "e", is mounted on the automobile.

The above-described conventional electronic unit box suffers from the following difficulty: When the automobile on which the electronic unit box is mounted is traveling, the automobile is vibrated, and accordingly the box body "a" is vibrated, and the electronic unit "d" is also vibrated; finally the latter "d" resonates, thus strongly striking against the inner wall "b" and the lid "e", and at worst, being broken.

In order to overcome this difficulty, a technique disclosed by Japanese Utility Model Unexamined Publication No. Sho 62-19021 may be employed. In the technique, as shown in FIG. 7, a fixing rib "g" provided on a water-proof cover "if" for a branch junction box J is applied to the lid "e" of the above-described electronic unit box. However, the structure that the fixing rib "g" is applied to the cover "f" is still disadvantageous in the following points: In order to positively fix the electronic unit, the cover must be high in rigidity. Hence, even if it is applied to the cover of the electronic unit box, it is difficult to completely suppress the vibration of the content such as an electronic unit when receiving vibration of the automobile.

SUMMARY OF THE INVENTION

In view of the foregoing, an object of the invention is to provide a structure for fixing an electronic unit in an electronic unit box, which positively fixes the electronic unit in the electronic unit box, prevents the occurrence of abnormal vibration or resonance even when vibrated by the automobile, and is high both in reliability and in durability.

The foregoing object of the invention has been achieved by the provision of an electronic unit fixing structure which comprises: an electronic unit box; an unit accommodating casing provided in the box body of the electronic unit box, to accommodate an electronic unit; and a lid which covers the box body to fixedly hold the electronic unit in the box body, in which, according to the invention, the lid has a plurality of first fixing ribs and a plurality of second fixing ribs on the top wall thereof which are arranged parallel, the first and second fixing ribs having step-shaped cuts in such a manner that the cuts are opposite to each other, so that when the box body is covered with the lid, the cuts of the fixing ribs are abutted against the opposite edges of the electronic unit to fixedly hold the electronic unit.

In the electronic unit fixing structure, it is preferable that the plurality of first fixing ribs are coupled through a coupling wall to each other, and the plurality of second fixing ribs are coupled through a coupling wall to each other.

It is practical that the plurality of first fixing ribs and the plurality of second fixing ribs are extended from first and second fixing protrusions towards each other which are provided on two opposite walls of the lid, respectively.

It is suitable that first and second fixing flanges are extended from two opposite walls of the box body, while first and second fixing protrusions are extended from two opposite walls of the lid, and the first and second fixing flanges and the first and second fixing protrusions are fixedly combined together with screws to cover the box body with the lid.

BRIEF DESCRIPTION OF THE DRAWINGS

FIG. 3 is a sectional view taken along line X—X in FIG. 2.

FIG. 4 is a sectional view taken along line Y—Y in FIG. 2.

DETAILED DESCRIPTION OF THE INVENTION

One preferred embodiment of the invention will be described with reference to the accompanying drawings.

Figure 1:
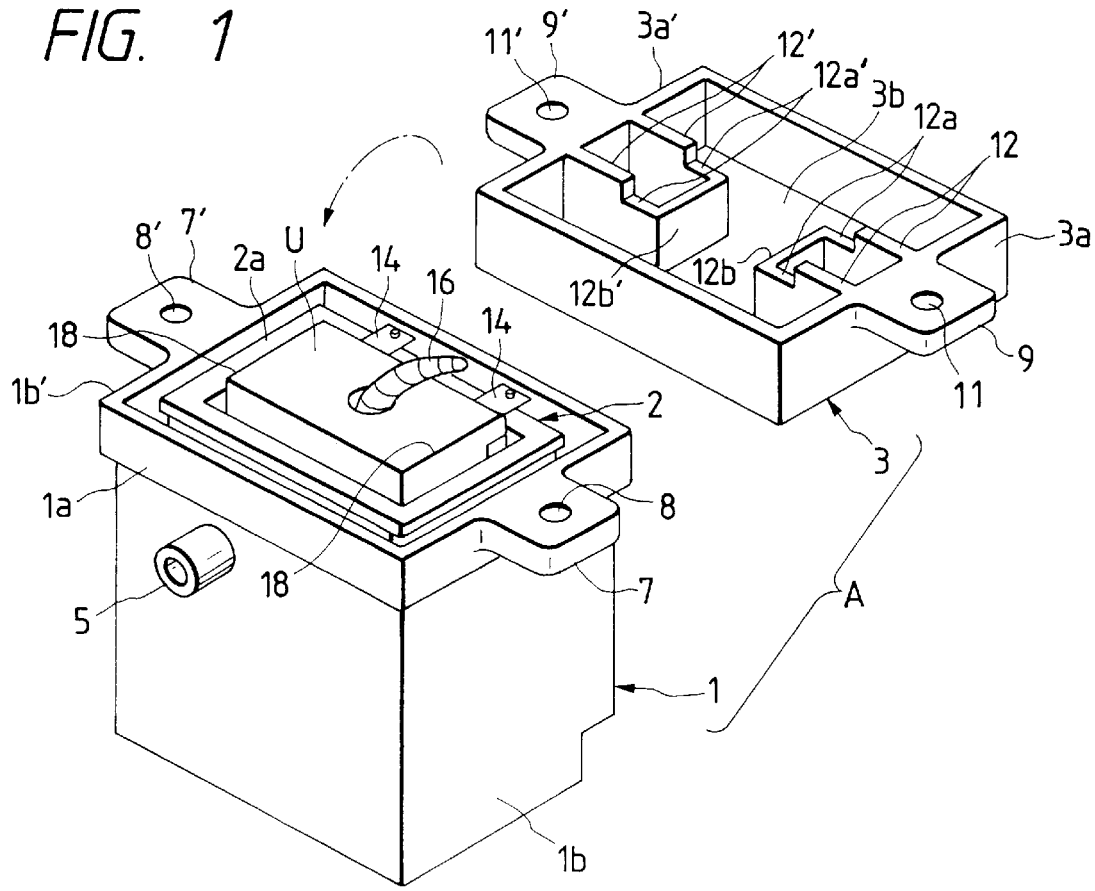
FIG. 1 is a perspective view showing an electronic unit box with its lid opened, which constitutes an embodiment of the invention.
Figure 2:
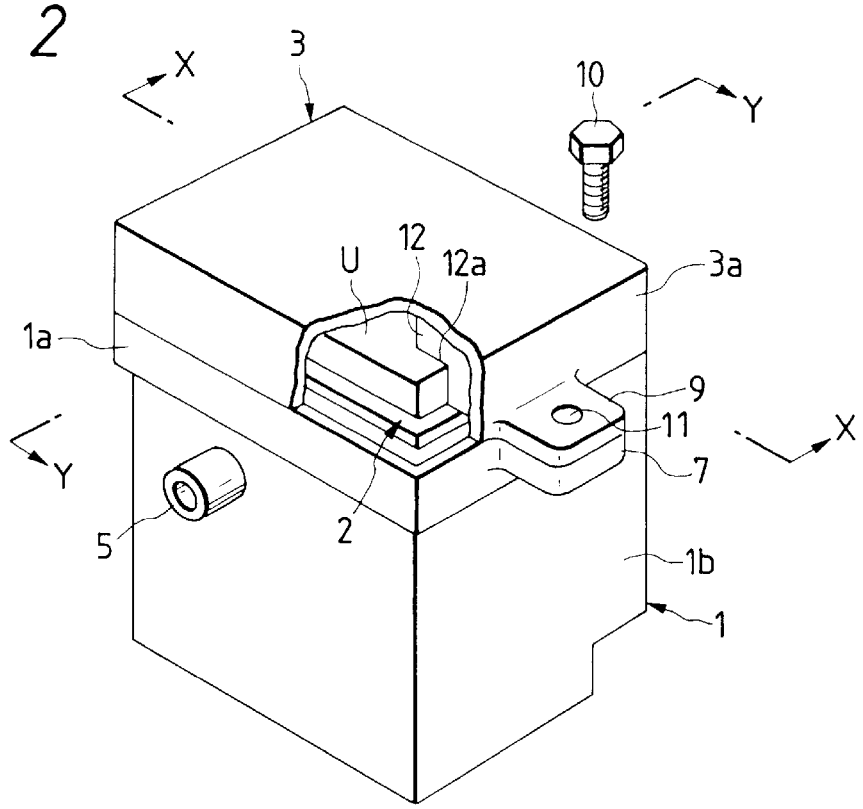
FIG. 2 is a perspective view, with parts cut away, showing the electronic unit box illustrated in FIG. 1.
Figure 5:
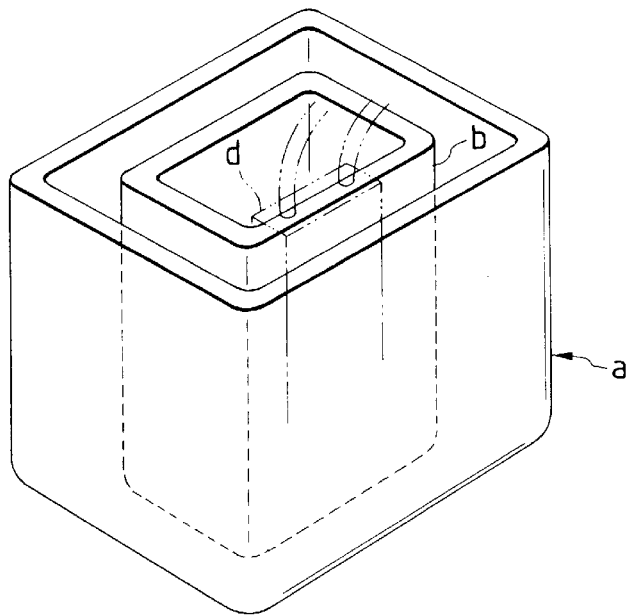
FIG. 5 is a perspective view showing a conventional electronic unit box.
Figure 6:
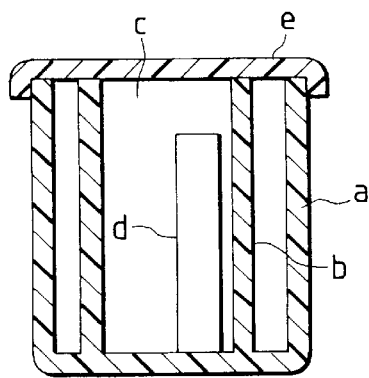
FIG. 6 is a vertical sectional view of the conventional electronic unit box shown in FIG. 5.
Figure 7:
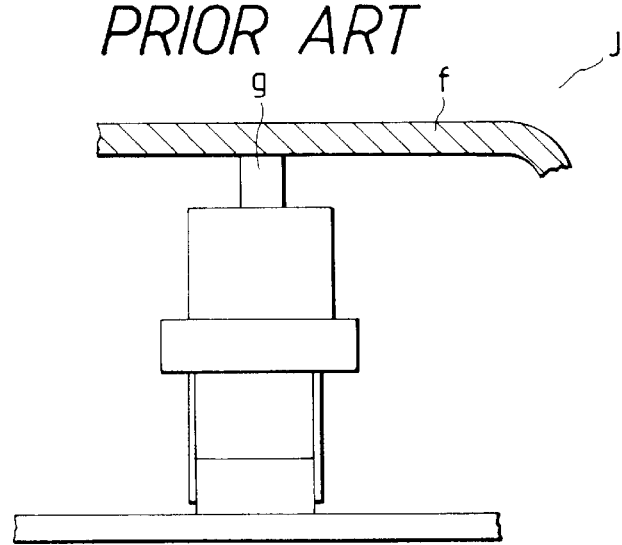
FIG. 7 is a sectional view showing a conventional fixing rib.

FIG. 1 is a perspective view showing an electronic unit box A according to the invention with its lid removed. FIG. 2 is a perspective view, with parts of the lid cut away, showing the electronic unit box A covered with the lid.

The electronic unit box A comprises a box body 1, a separate unit accommodating casing 2, and a lid 3. The electronic unit box A is designed as follows: The unit accommodating casing 2 is set in the box body 1, an electronic unit U is set in the unit accommodating casing 2, and then the box body 1 is covered with the lid 3 to fix the electronic unit U.

Figures 3, 4:
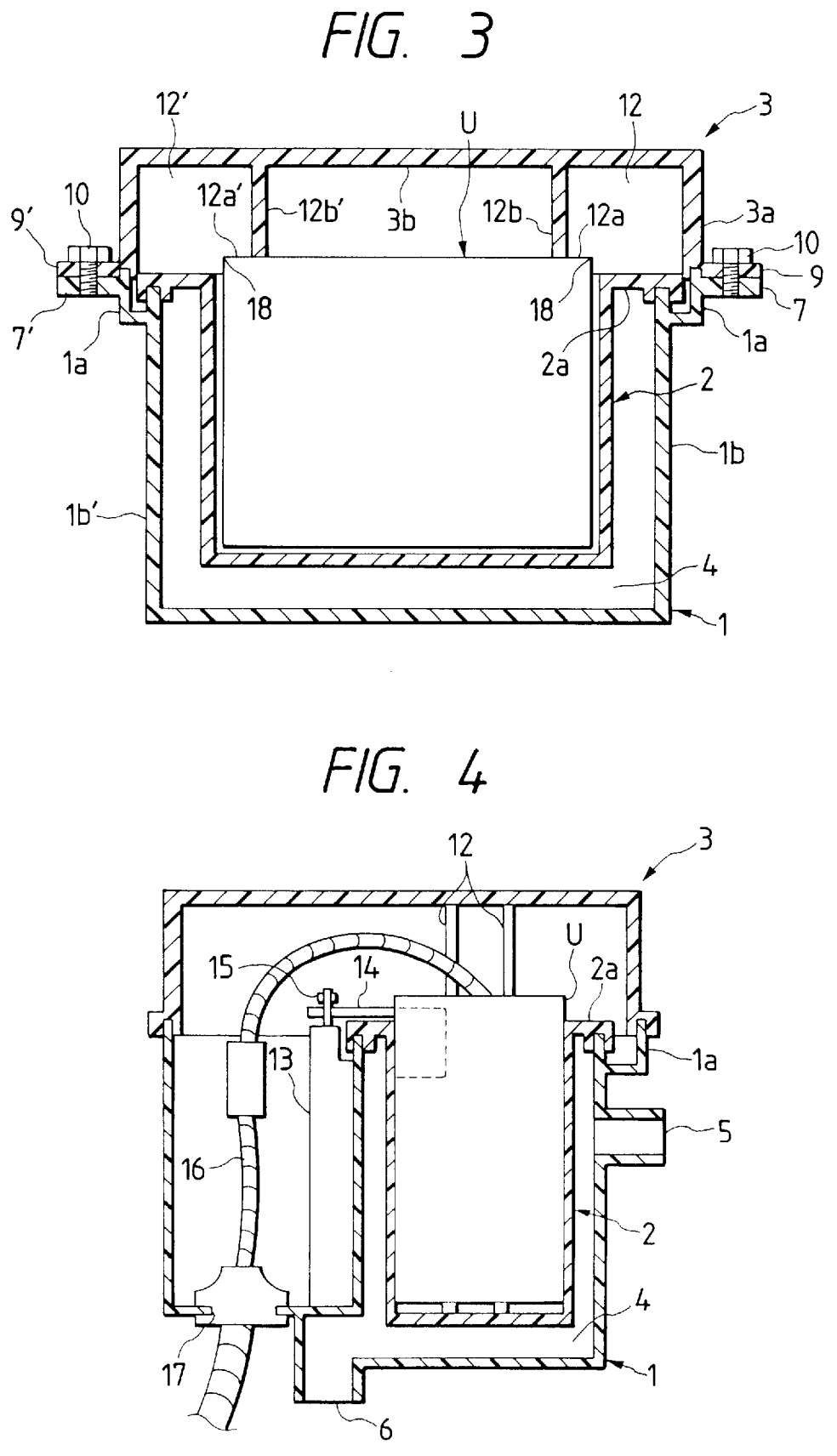

The box body 1 is formed by molding synthetic resin, and it is in the form of a rectangular box. The upper portion of the box body 1 is formed into a flange 1a which is engaged with the lid 3. As shown in FIGS. 3 and 4, the unit accommodating casing 2 is set in the box body 1 with a cooling air way 4 formed inside it. The box body 1 has an air suction port 6 and an air discharge port 5 which are communicated with the cooling air way 4. A stream of air flowing through the air suction port 6 cools the outer surface of the unit accommodating casing 2.

Fixing flanges 7 and 7' are extended from the outer surfaces of the upper edges of side walls 1b and 1 b' of the box body 1 which are opposite to each other, respectively. The fixing flanges 7 and 7' have threaded holes 8 and 8', respectively.

The unit accommodating casing 2 is in the form of a thin rectangular box, and its upper portion is formed into a flange 2a. The flange 2a is engaged with the surrounding wall of the box body 1 which includes the aforementioned side walls 1b and 1b', while forming the cooling air way 4 in the box body 1.

The lid 3 is in the form of a thin rectangular box. Fixing protrusions 9 and 9' are extended from the outer surfaces of the edge portions of two opposite side walls 3a and 3a' of the lid 3, in correspondence to the fixing flanges 7 and 7' of the box body 1, respectively. The fixing protrusions 9 and 9' have through-holes 11 and 11 into which fixing screws 10 are inserted, respectively.

Two first fixing ribs 12 and 12, and two second fixing ribs 12' and 12' are extended towards each other from the fixing protrusions 9 and 9' in such a manner that they are arranged parallel. The first fixing ribs 12 and 12 and the second fixing ribs 12' and 12' have step-shaped cuts 12a and 12a', and coupling walls 12b and 12b' at the inner ends which couple the first fixing ribs 12 and 12 and the second fixing ribs 12' and 12', respectively.

The unit accommodating casing 2 is fitted in the box body 1, and the electronic unit U is set in the unit accommodating casing 2. The electronic unit U is supported therein as follows: That is, the electronic unit U is secured through a bracket 14 to a supporting post 13, which is erected on the box body 1, with a bolt 15. In FIG. 4, reference numeral 16 designates a wire harness through which the electronic unit U is connected to an external circuit. The wire harness 16 is extended outside the box body 1 through a lead-out hole 17 formed in the latter.

After the electronic unit U has been set as described above, the box body 1 is covered with the lid 3, and then the screws 10 are inserted into the holes 11 of the fixing protrusions 9 and 9'. Under this condition, the screws 10 are threadably engaged with the threaded holes 8 and 8' of the fixing flanges 7 and 7' of the box body 1, so that the lid 3 is fixedly secured to the box body 1 while the electronic unit U is fixed to the box body 1.

In this case, as shown in FIGS. 2 and 3, the cuts 12a and 12a' of the first and second fixing ribs 12 and 12' of the lid 3 are abutted against (engaged with) the opposite edges 18 and 18' of the electronic unit U, thereby to positively lock the electronic unit U. Hence, even when the electronic unit box is vibrated by the automobile, the electronic unit U will never be abnormally vibrated, nor resonates; that is, it is held stable at all times.

In the above-described embodiment, two fixing first ribs 12 and two second fixing ribs 12' are arranged in parallel; however, the invention is not limited thereto or thereby. That is, more than two ribs 12 and more than two ribs 12' may be employed.

In the electronic unit fixing structure according to the invention, the electronic unit is fixedly held with the opposite cuts of the first and second fixing ribs which are formed parallel on the lid-of the electronic unit box. Therefore, with the electronic unit fixing structure, the electronic unit can be fixedly held therein. The plurality of first fixing ribs are coupled to one another with the first coupling wall, while the plurality of second fixing ribs are coupled to one another with the second coupling wall. Hence, each of the first and second fixing ribs is high in rigidity, and the electronic unit can be certainly held. Therefore, even if the electronic unit box mounted on a automobile is vibrated when the automobile is traveling, the electronic unit will not be abnormally vibrated nor abnormally resonate. This means that the electronic unit is prevented from being damaged by abnormal vibration, thus being improved in reliability and in durability.

What is claimed is:

1. An electronic unit fixing structure of an electronic unit box, comprises:

a box body of the electronic unit box;

a unit accommodating casing provided in said box body, to accommodate an electronic unit; and a lid which covers said box body to fixedly hold the electronic unit in said box body;

wherein a plurality of first fixing ribs parallel to each other and a plurality of second fixing ribs parallel to each other are disposed on a top wall of said lid; and wherein said first and second fixing ribs have step-shaped cuts opposite to each other, so that when said box body is covered with said lid, said cuts of said first and second fixing ribs are abutted against opposite edges of the electronic unit to fixedly hold the electronic unit.

2. An electronic unit fixing structure as claimed in claim 1, wherein said plurality of first fixing ribs are coupled through a first coupling wall to each other and said plurality of second fixing ribs are coupled through a second coupling wall to each other.

3. An electronic unit fixing structure as claimed in claim 1, wherein said lid includes a first fixing protrusion and a second fixing protrusion provided on two opposite walls of said lid, and said plurality of first fixing ribs and said plurality of second fixing ribs are extended from said first and second fixing protrusions towards each other, respectively.

4. An electronic unit fixing structure as claimed in claim 1, wherein said box body includes first and second fixing flanges extended from two opposite walls of said box body; said lid includes first and second fixing protrusions extended from two opposite walls of said lid; and said first and second fixing flanges and said first and second fixing protrusions are fixedly combined together with screws to cover said box body with said lid.

* * * * *